Aug. 22, 1961 R. A. PENDLETON 2,997,246

MECHANICAL APPARATUS

Filed Feb. 18, 1960 3 Sheets-Sheet 1

INVENTOR:
Robert A. Pendleton,
BY Bair, Freeman & Molinare
ATTORNEYS.

Aug. 22, 1961 R. A. PENDLETON 2,997,246

MECHANICAL APPARATUS

Filed Feb. 18, 1960 3 Sheets-Sheet 2

INVENTOR:
Robert A. Pendleton,
BY Bair, Freeman & Molinare
ATTORNEYS.

INVENTOR:
Robert A. Pendleton.
BY Bair, Freeman & Molinare
ATTORNEYS.

United States Patent Office 2,997,246

Patented Aug. 22, 1961

2,997,246

MECHANICAL APPARATUS

Robert A. Pendleton, Dedham, Mass., assignor to Minneapolis-Honeywell Regulator Company, Minneapolis, Minn., a corporation of Delaware Filed Feb. 18, 1960, Ser. No. 9,632

7 Claims. (Cl. 242—55.12)

This invention relates generally to apparatus for handling flexible strip members, and more particularly to new and improved high speed apparatus for handling elongated tapes, such as record tapes of the type having information stored thereon.

There are numerous instances where it is desirable to write information onto or read information from an elongated record tape by driving the tape from a supply reel to a take-up reel past suitable information transfer means. A representative apparatus for effecting this operation may take the form, for example, of a magnetic tape handling mechanism for magnetic recording and playback apparatus. In such mechanisms, the magnetic tape is stored on a supply reel from which the tape is transported by suitable capstan action past a recording and playback head to a take-up reel.

In modern-day applications of such magnetic tape handling mechanisms, the reels are coupled to their driving shafts by mechanical or suction clamping means. Due to the high speed of rotation of such reels, it is important that the reels be firmly held to their driving shafts during the operation of the tape handling mechanism. While a firm coupling is required when the reel is in position to be driven, it also is important that the reel be readily de-coupled from the driving shaft when an operator desires to remove the reel at the end of a recording or playback operation.

It further is important, in the event of some abnormal or emergency condition, such as a power failure, that the reels remain clamped to their driving shafts and that the high speed rotation of the reels be slowed down or stopped as soon as possible after the occurrence of the emergency condition. Such emergency braking action is required not only to protect the tape and the tape handling mechanism, but also to protect personnel and other equipment in the vicinity of the apparatus from the danger of loose or accidentally uncoupled reels.

Those skilled in the art will also readily appreciate that such high speed tape handling mechanisms generally require heavy duty frames for supporting the reels and the reel driving structure to maintain accurate alignment and to minimize vibration and other potential problems inherent in the use of such apparatus.

Accordingly, it is a general object of this invention to provide a new and improved tape handling apparatus suitable for use with high speed reels of the mechanical or suction coupled type.

It is a further object of this invention to provide an improved emergency brake for use with high speed reels and their driving means in tape handling apparatus which serves to slow down and stop reel rotation in response to the occurrence of a power failure in the apparatus.

It is a still further object of this invention to provide an improved emergency tape reel brake, as above, which is particularly adapted for use with tape handling apparatus of the type having a source of vacuum, such as a tape drive unit having pneumatically controlled capstans.

It is another object of this invention to provide in tape handling apparatus the improvement of pneumatically operated emergency brake means for a tape reel which acts in response to a power failure to slow down and stop reel rotation.

It is still a further object of this invention to provide new tape handling apparatus of improved structural strength and rigidity for use with tape bearing reels adapted to operate at high speeds of rotation.

It still is another object of this invention to provide such new tape handling apparatus wherein the frame construction members are utilized as conduits and reservoirs of the fluid pressure employed for the operation of the capstans and the emergency reel brake means described above.

It is a still further object of this invention to provide new and improved tape handling apparatus characterized by its rugged construction, its many safety features, and its efficiency in operation.

The novel features which are characterized in this invention are set forth with particularity in the appended claims. The invention itself, however, both as to its organization and operation, together with further objects and advantages thereof, will best be understood by reference to the following description taken in conjunction with the accompanying drawings in which:

Figure 1:
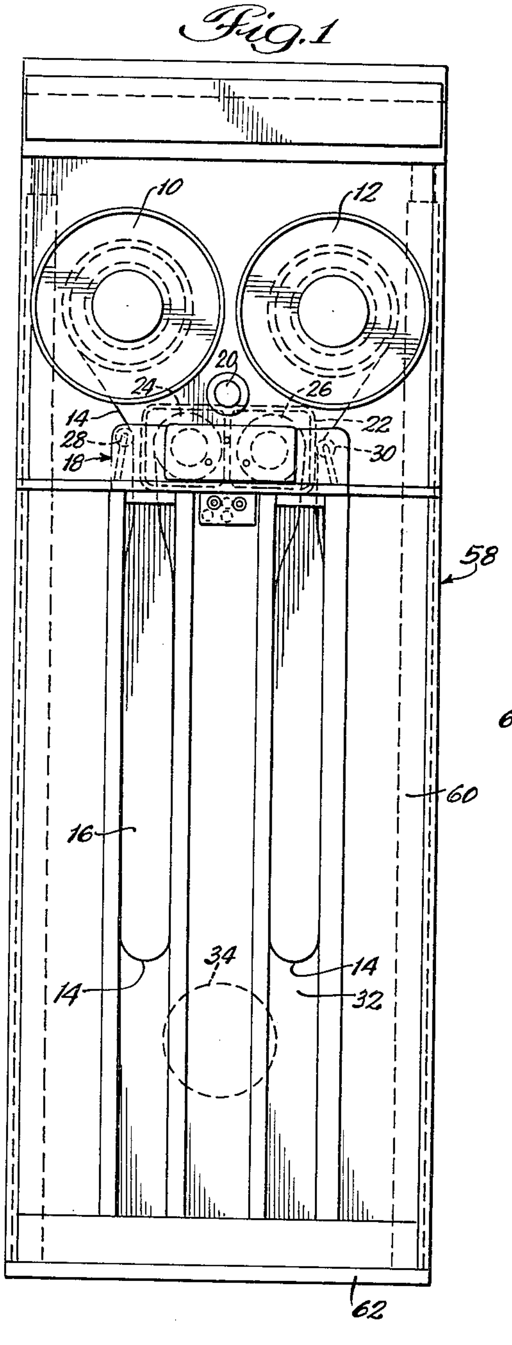
FIGURES 1 and 2 are front and rear elevational views respectively of one illustrative embodiment of the tape handling apparatus embodying the invention.
Figure 2:
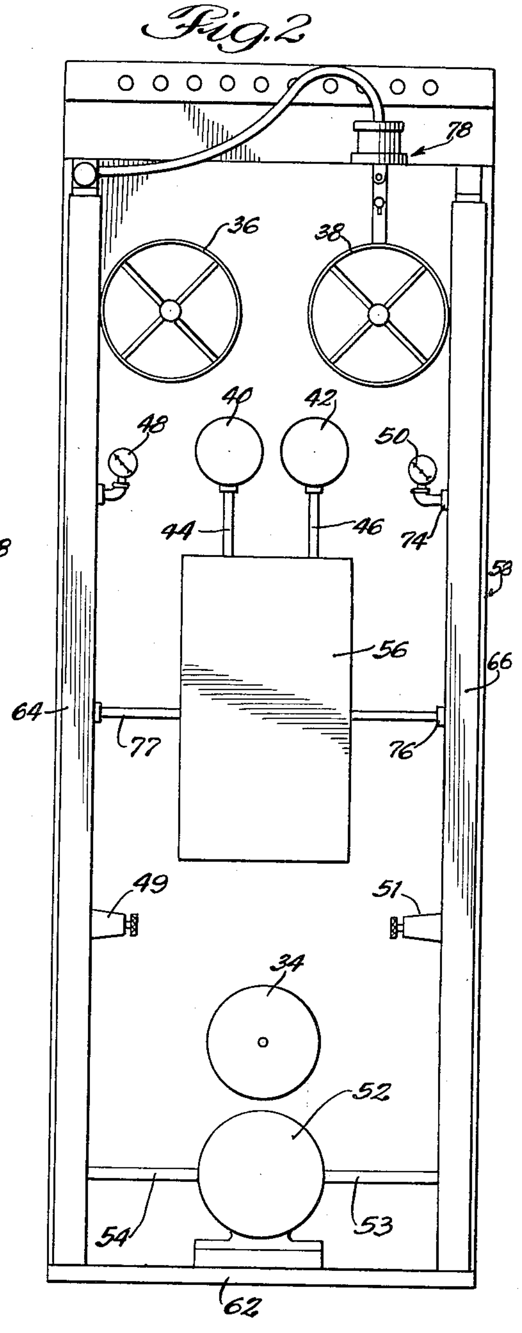
Figure 3:
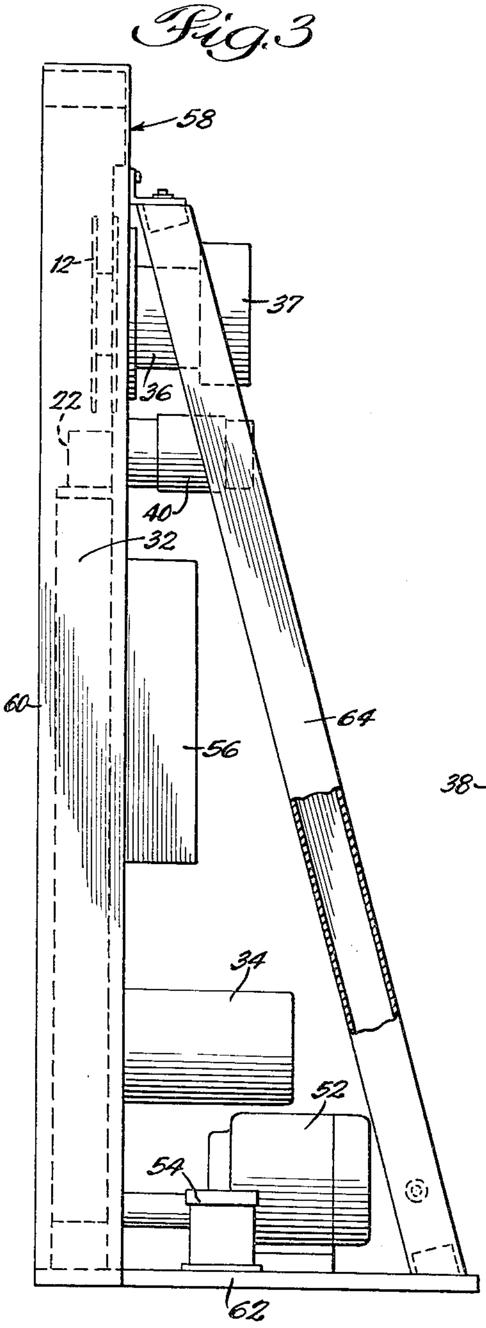
FIGURE 3 is a side elevational view, partly in cross-section, of the illustrative tape handling apparatus of FIGURES 1 and 2.

Referring now to the drawing, and more particularly to FIGURES 1, 2, and 3, thereof, there is illustrated a magnetic tape handling mechanism which is adapted to move a magnetic tape from a supply reel to a take-up reel past a suitable data transducing or transfer head. In the particular embodiment of the magnetic tape handling mechanism shown, the magnetic tape is adapted to be driven selectively in either direction between the reels and in either direction past the data transfer head associated with the tape.

More specifically, FIGURE 1 illustrates a pair of tape storage reels 10 and 12 which are adapted interchangeably to serve as supply and take-up reels dependent upon the direction of tape movement. For example, when the reel 10 is serving as the supply reel, the tape 14 wound thereon is arranged to pass from the reel 10 into a first loop chamber 16, the latter providing a certain amount of slack in the tape between the reel 10 and a data transfer mechanism 18. The data transfer mechanism 18 advantageously comprises a data transfer head 20, a capstan assembly 22, which includes a pair of contra-rotating capstans 24 and 26, and the tape guide means 28 and 30.

On the other side of the data transfer mechanism 18, there is provided a further loop chamber 32 which also serves to provide slack in the tape 14 between the data transfer mechanism 18 and the reel 12. Advantageously, the loop chambers 18 and 32 have a sub-atmospheric pressure supplied thereto by way of a sub-atmospheric pressure pump 34 adapted to communicate with the loop chambers by means of suitable ports to maintain a sub-atmospheric pressure below the loops of the tape in the loop chambers. Illustrative apparatus of this type suitable for use with the present invention is disclosed, for example, in the R. B. Lawrance et al. Patent No. 2,837,330.

The reels 10 and 12 are adapted to be selectively driven by the reel drive motors 36 and 38, and in accordance with the teachings of the prior art, the reels may be held in position on the rotating shafts of the reel drive motors by suitable pneumatic means supplied with a fluid pressure signal, or by suitable mechanical clamping devices.

In the specific embodiment illustrated in FIGURES 1, 2, and 3, of the drawing, the contra-rotating capstans 24 and 26 are adapted to selectively control the direction of tape movement by the selective application of sub-atmospheric pressures to the capstans under the control of pneumatic switching control means. As particularly shown in FIGURES 1 and 2 of the drawing, capstan 26 is adapted to be rotated in one direction by the capstan drive motor 40 and capstan 24 is adapted to be rotated in the opposite direction by the capstan drive motor 42. The vacuum and pressure signals used for controlling the direction of tape movement are supplied to the capstans through the lines 44 and 46 which are connected to a control unit indicated generally at 56.

As shown in FIGURES 2 and 3 of the drawing, the tape handling mechanism is provided with a main pump 52 which is adapted to provide a vacuum on line 54 and a pressure on line 53. Obviously, two pumps could be used to provide these operating fluid pressures. The various tape control devices which may be utilized with the invention have not been shown in detail herein as they do not form a part of this invention, but if desired, several illustrative mechanisms for controlling the tape movement of the type comprising the tape drive control switch apparatus 56, may be seen in greater detail in the Pendleton Patent 2,866,637, issued December 30, 1958.

In accordance with a specific feature of this invention, the various components of the magnetic tape handling mechanism described above are supported in a heavy-duty support frame 58 which comprises a front panel 60, a base 62, and a pair of spaced-apart, rigid support members 64 and 66. Advantageously, support members 64 and 66 are firmly secured to the front panel 60 and to the base 62 so as to form a generally triangular support frame wherein the front panel and base comprise two arms of a right triangle, and each rigid support member comprises the hypotenuse to complete the generally right triangular shaped structure formed by the support frame. Manifestly, those skilled in the art will appreciate that this construction is characterized by its extreme strength and rigidity, a construction which has been found highly advantageous in supporting the relatively heavy and high speed rotating components of the tape drive mechanism.

It is an important feature of this invention that the spaced-apart, rigid support members 64 and 66 of the support frame 58 may serve as surge and storage chambers for the pneumatically operable apparatus of the tape transport mechanism. To this end, as particularly illustrated in FIGURES 2 and 3 of the drawing, the support member 66 comprises a fully enclosed hollow duct which has air under pressure supplied thereto by way of line 53. It can be seen in FIGURE 2 that the vacuum line 54 is coupled to the chamber 64. The tape drive unit 56 may receive air under pressure from the hollow duct support member 66, by the line 76 and vacuum by way of the line 77. Pressure and vacuum gauges 50 and 48, respectively, may be coupled to the chambers 66 and 64, respectively. Regulators 49 and 51 may also be coupled to the chambers 64 and 66 to stabilize and regulate the vacuum and pressure in the chambers 64 and 66, respectively.

In accordance with another important feature of this invention, support member and vacuum chamber 64 is also adapted to serve as a fluid pressure reservoir for use with an emergency reel brake apparatus 78.

Figure 4:
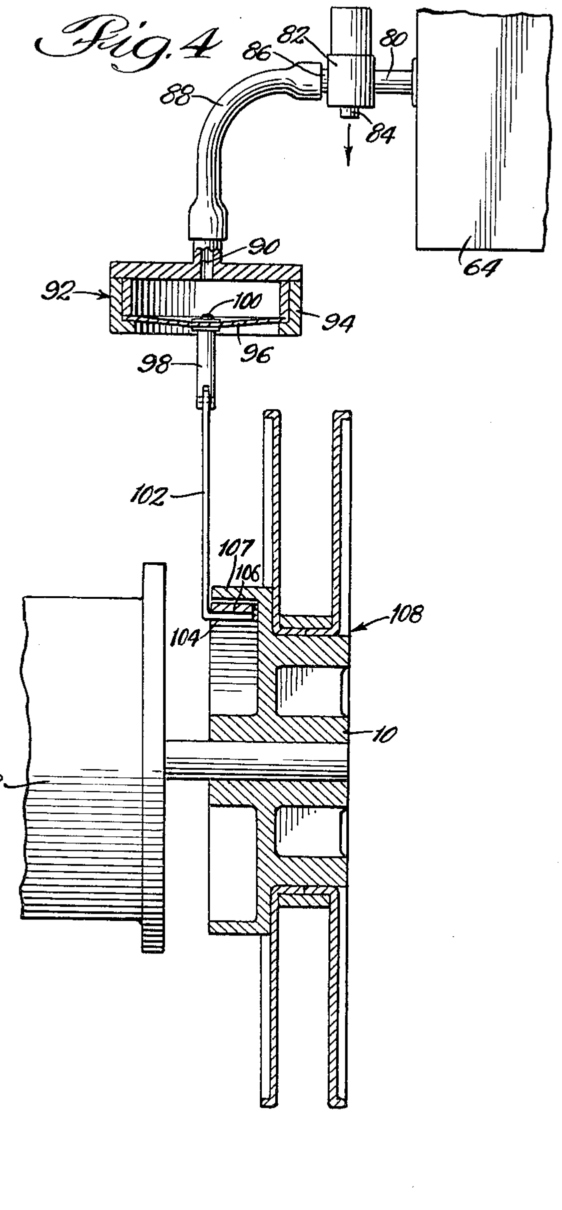
FIGURE 4 is an illustrative view, partly in cross-section of a pneumatic emergency reel brake in accordance with the invention.

Reference is made to FIGURE 4 of the drawing for an illustrative diagram embodying this feature of the invention. The hollow duct support member 64, as stated hereinabove, serves as a vacuum reservoir or chamber and, for example, advantageously may be held at a sub-atmospheric pressure or vacuum equal to approximately 15 inches of mercury. The hollow duct support member 64 is coupled to one inlet 80 of a three-way solenoid pneumatic valve 82. A second inlet 84 of valve 82 advantageously is adapted to be connected to a source of atmospheric pressure, and the outlet 86 of valve 82 is coupled through tubing 88 to the inlet 90 of the emergency reel brake actuator assembly 92.

As shown in detail in FIGURE 4 of the drawing, the brake actuator assembly 92 comprises a hollow cylindrical brake cup 94 within which a brake diaphragm 96 is adapted to be moved, in accordance with the fluid pressure applied thereto. As shown in the drawing, when the three-way solenoid valve 82 is operated to permit atmospheric pressure to be communicated with the brake cup 94, the brake diaphragm 96 is in the position shown at the bottom of the brake cup. However, when the three-way solenoid valve is operated to permit the sub-atmospheric pressure from the fluid reservoir 64 to be communicated with the brake cup 94, the brake diaphragm 96 is drawn upwardly in the brake cup.

The brake diaphragm 96 is securely attached to a brake rod 98, as by a screw 100, and the brake rod 98 is coupled to the elongated, L-shaped, brake member 102 mounted by suitable means, not shown in FIGURE 4, to prevent lateral movement. As shown in FIGURE 4 of the drawing, the horizontal arm 104 of the brake member 102 advantageously is provided with a friction pad 106 which is adapted to frictionally engage a brake surface, such as the reel mounting hub 107 of reel 108, whenever the brake diaphragm 96 is pulled upwardly by the vacuum pressure from reservoir 64.

The operation of the invention now can be fully understood by those skilled in the art. During the normal operation of the tape handling mechanism, the tape reel 10 is adapted to be rotated at relatively high speeds by the reel drive motor 38. During this time, the three-way solenoid valve 82 is energized to permit atmospheric pressure to be communicated to the brake assembly 92 and, at the same time, to prevent the vacuum in the vacuum reservoir formed by the hollow duct support member 64 from reaching the brake assembly 92. Should some abnormal or emergency condition occur—such as a power failure—the invention serves to slow down and stop the operation of the tape reel mechanism despite the absence of operating power at this time.

Thus, in accordance with the invention, a power failure in the apparatus results in the de-energization of the three-way solenoid valve 82 which acts to cut off the atmospheric pressure supply to the brake assembly and to communicate the vacuum in the vacuum reservoir thereto. Upon the application of the vacuum to the brake cup 94, the brake diaphragm 96 is abruptly pulled up into operating position, and in turn, the friction pad 106 on the brake arm is pulled into frictional engagement with the brake surface defined by the reel mounting hub 107. Due to the capacity of the vacuum reservoir formed by the elongated, hollow duct support member 64, there is sufficient vacuum pressure within the duct to maintain the brake in operative position against the reel 10 for a period of time sufficient to slow down and stop the rotation of the reel mechanism.

Accordingly, it can now be appreciated that the invention serves to brake the reel and prevent possible injury to the tape, the tape drive apparatus or to the operating personnel despite a complete lack of any electrical power for the tape handling mechanism. Those skilled in the art will further appreciate that the braking effect on the tape reel by the vacuum operated brake may be aided by suitable electro-magnetic braking in the reel drive motor which also serves to facilitate the slowing down of reel rotation when electrical energy is removed from the reel motor. While the brake is shown coupled to the reel mounting hub 107, it will be apparent that the brake may be made effective at other points in the reel drive and support mechanism to insure that the tape reel rotation is stopped upon an electrical power failure.

Figure 6:
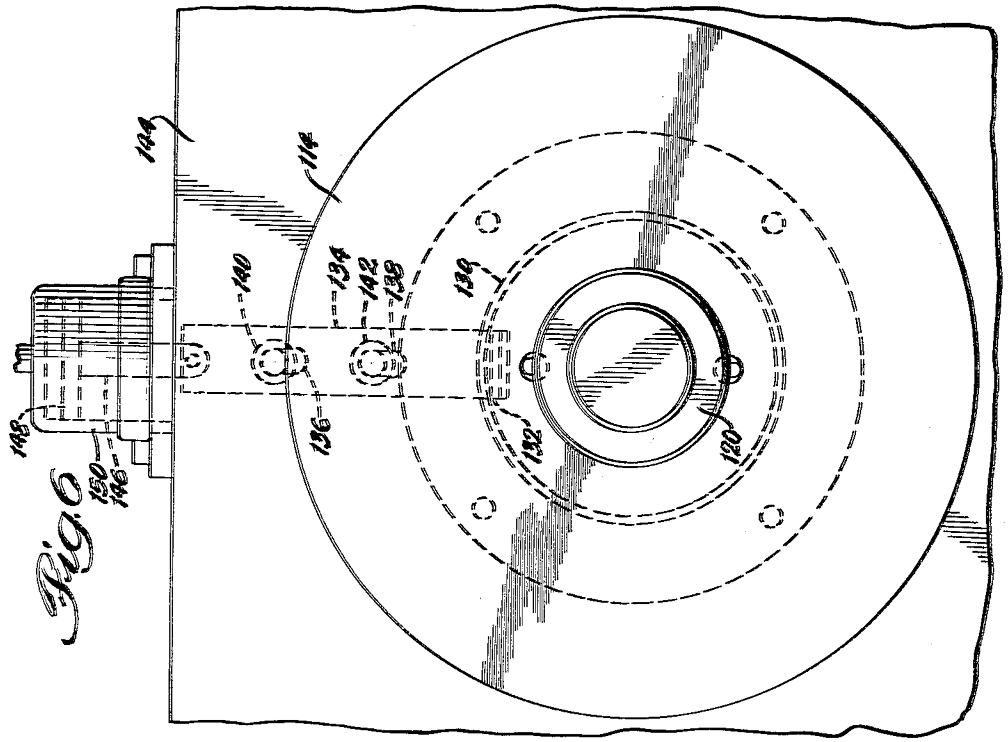
FIGURES 5 and 6 are detailed side and front elevational views respectively, partly in cross-section, of a preferred embodiment of tape handling reel and emergency brake apparatus embodying the invention.
Figure 5:
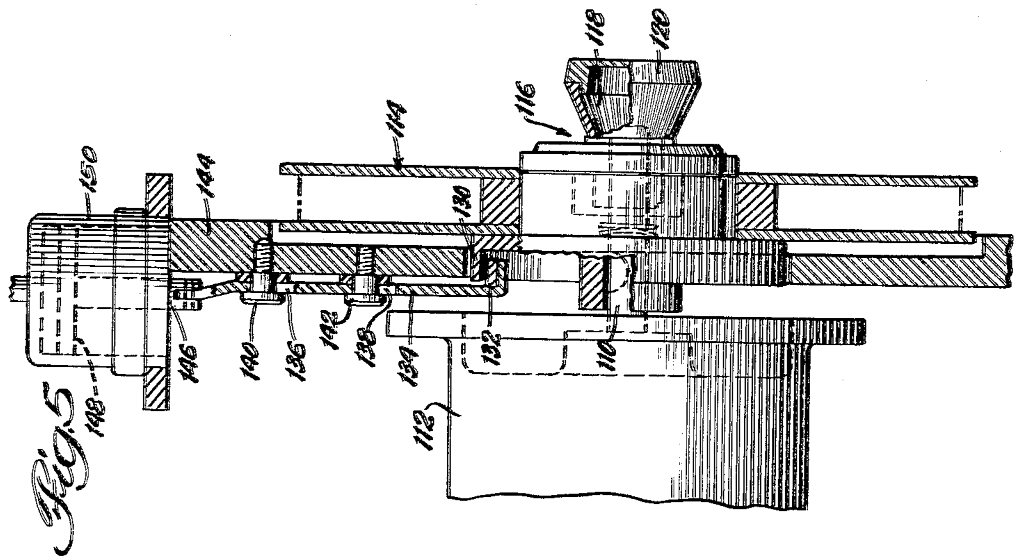

One specific construction of the emergency reel braking apparatus embodying the invention is shown in FIGURES 5 and 6 of the drawing. As there shown, shaft 110 of reel drive motor 112 is adapted to be operatively secured to the reel 114 by the mechanical reel clamping means shown generally at 116.

The brake drum 130 at the inboard side of the reel 114 is adapted to be frictionally engaged by the friction pad 132 supportingly mounted on the elongated brake member 134. A pair of guide slots 136 and 138 are formed in the brake member 134, and are adapted to receive a pair of guide screws 140 and 142, respectively, which are threadedly secured to the support panel 144. The uppermost end of the brake member 134 is coupled to the brake rod 146, which in turn, is connected to the brake diaphragm 148 within the brake cup 150.

Thus, it can be seen that upon the application of the vacuum pressure to the brake cup 150—due to a power failure in the apparatus—the diaphragm 148 is pulled up within the cup 150 to cause the brake friction pad 132 to frictionally engage the reel hub 130. The guide screws 140 and 142 together with their guide slots 136 and 138, respectively, serve to guide the brake member 134 and to permit to to be either raised or lowered in accordance with the pressure applied to the brake cup to permit the reel to freely rotate during normal operation or to cause the reel to be braked during emergency conditions, such as a power failure.

There has been shown and described several specific illustrative embodiments of the present invention in which a magnetic tape handling mechanism is adapted to be supported by a rigid frame assembly in which portions of the frame structure are utilized as fluid pressure conduits. There also has been shown several illustrative embodiments of the invention in which a pneumatically operated brake is actuated upon an electrical power failure to apply braking force to a brake surface coupled to the reel as for example, the reel mounting hub. Those skilled in the art will readily appreciate that the pneumatically operated brake may be applied with advantageous effect to the other portions of the reel, the reel motor, or the reel drive shaft, if desired.

It will, of course, be understood that the specific embodiments disclosed above are merely illustrative of the principles of the invention, and that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of record tape handling apparatus comprising a pair of reels, a drive shaft for each reel adapted to be coupled thereto for rotating the reel, a pair of contrarotating drive capstans for moving the record tape from one reel to the other past suitable tape signal transducing means, a pneumatic operative signal source, control means for selectively coupling said pneumatic source to said capstans to control the direction of tape movement; a heavy-duty support frame for said tape handling apparatus including a plurality of rigid support members, at least one of said support members comprising a hollow duct forming a pneumatic conduit between said source and said capstans; emergency reel stopping means associated with at least one of said reels, said stopping means including a friction brake adapted when actuated to frictionally engage a brake surface associated with said reel and applying a braking force thereto, pneumatically operable means for operating said friction brake in response to the application of a pneumatic signal thereto, and a pneumatic reservoir for said emergency reel stopping means adapted to supply a pneumatic signal to said pneumatically operable means in response to a power failure in said tape handling apparatus, said pneumatic reservoir comprising a hollow duct frame support member forming a pneumatic conduit between said source and said pneumatically operable means.

2. The improvement of record tape handling apparatus comprising a pair of reels, a drive shaft for each reel adapted to be coupled thereto for rotating the reel, a pneumatic signal source, a heavy-duty support frame for said tape handling apparatus including a plurality of rigid support members, emergency reel stopping means associated with at least one of said reels, said stopping means including a friction brake adapted when actuated to frictionally engage a brake surface coupled to the reel and apply a braking force thereto, pneumatically operable means for operating said friction brake in response to the application of a pneumatic signal thereto, and a pneumatic reservoir for said emergency reel stopping means adapted to supply a pneumatic signal to said pneumatically operable means in response to an emergency condition in said tape handling apparatus, said pneumatic reservoir comprising a hollow duct frame support member forming a pneumatic conduit between said source and said pneumatically operable means.

3. The improvement of record tape handling apparatus comprising a pair of rotatable reels, a heavy-duty support frame for said tape handling apparatus including a plurality of rigid support members, at least one of said support members comprising a fully enclosed hollow duct, a source of fluid pressure; emergency reel stopping means associated with at least one of said reels, said stopping means including a friction brake adapted when actuated to frictionally engage rotatable means coupled to the reel and apply a braking force thereto, fluid pressure operable means for operating said friction brake in response to the application of fluid pressure thereto, and a fluid pressure reservoir for said emergency reel stopping means adapted to supply fluid pressure to said fluid pressure operable means in response to an emergency condition in said tape handling apparatus, said fluid pressure reservoir comprising said hollow duct frame support member forming a fluid pressure conduit between said source and said fluid pressure operable means.

4. The improvement of emergency reel clamping means for record tape handling apparatus of the type having a pair of rotatable reels comprising a source of fluid pressure, a heavy-duty support frame for said tape handling apparatus including a plurality of rigid support members, at least one of said support members comprising a fully enclosed hollow duct, a friction brake adapted when actuated to frictionally engage rotatable means coupled to a rottatable reel and apply a braking force thereto, fluid pressure operable means for operating said friction brake in response to the application of fluid pressure thereto, and a fluid pressure reservoir for said friction brake operable means adapted to supply fluid pressure to said fluid pressure operable means in response to an emergency condition in said tape handling apparatus, said fluid pressure reservoir comprising said hollow duct frame support member forming a fluid pressure conduit between said source and said fluid pressure operable means.

5. The improvement of emergency reel brake means for record tape handling apparatus of the type having a pair of rotatable reels, comprising a friction brake adapted when actuated to frictionally engage means coupled to a rotatable reel and apply a braking force thereto, fluid pressure operable means for operating said friction brake in response to the application of a fluid pressure thereto, and a fluid pressure reservoir for said emergency reel clamping means adapted to supply fluid pressure to said fluid pressure operable means in response to a power failure in said tape handling apparatus, said fluid pressure reservoir comprising an elongated, rigid, hollow duct frame support member for the record tape handling apparatus.

6. The improvement of emergency reel brake means for use in record tape handling apparatus of the type having a pair of rotatable reels, comprising a source of subatmospheric pressure, a heavy-duty support frame for said tape handling apparatus including a plurality of rigid support members, at least one of said support members comprising a fully enclosed hollow duct forming a fluid pressure conduit connected to said source; emergency reel clamping means associated with at least one of said reels, said clamping means including a friction brake adapted when actuated to frictionally engage means coupled to the reel and apply a braking force thereto, and fluid pressure operable means connected to said hollow duct for actuating said friction brake in response to the occurrence of an emergency condition in said tape handling apparatus.

7. The improvement of emergency reel brake means in accordance with claim 6 wherein said source of subatmospheric fluid pressure comprises an electrically operated vacuum pump, and said hollow duct support member is formed with sufficient fluid pressure storage capacity to operate said fluid pressure operable means and said friction brake to slow down and stop the rotation of said reel even though a power failure occurs and the vacuum pump ceases to operate.

References Cited in the file of this patent

UNITED STATES PATENTS 2,261,891 Stewart ---------------- Nov. 4, 1941